United States Patent
Vaddadi et al.

(10) Patent No.: US 9,443,353 B2
(45) Date of Patent: Sep. 13, 2016

(54) METHODS AND SYSTEMS FOR CAPTURING AND MOVING 3D MODELS AND TRUE-SCALE METADATA OF REAL WORLD OBJECTS

(75) Inventors: Sundeep Vaddadi, San Diego, CA (US); Krishnakanth S. Chimalamarri, San Diego, CA (US); Ketal V. Gandhi, San Diego, CA (US); Anubha Jayaswal, Atlanta, GA (US); Prince Gupta, San Diego, CA (US); Jose Ricardo Leal dos Santos, San Diego, CA (US); Chelsea Dereck, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/560,678

(22) Filed: Jul. 27, 2012

(65) Prior Publication Data

US 2013/0187905 A1     Jul. 25, 2013

Related U.S. Application Data

(60) Provisional application No. 61/565,663, filed on Dec. 1, 2011.

(51) Int. Cl.
*G06T 15/00* (2011.01)
*G06T 19/00* (2011.01)
(Continued)

(52) U.S. Cl.
CPC ............ *G06T 19/006* (2013.01); *G06T 15/205* (2013.01); *G06T 19/20* (2013.01); *G06T 2210/04* (2013.01); *G06T 2219/2021* (2013.01)

(58) Field of Classification Search
CPC ....... G06T 19/00; G06T 17/20; G06T 17/00; G06T 15/10; G06T 15/00
See application file for complete search history.

(56) References Cited

U.S. PATENT DOCUMENTS

2005/0108180 A1*  5/2005  Iwane ............................ 706/46
2009/0279784 A1*  11/2009  Arcas et al. .................. 382/190
(Continued)

FOREIGN PATENT DOCUMENTS

CN     102194254 A     9/2011
JP     2003216981 A    7/2003
(Continued)

OTHER PUBLICATIONS

Debevec et al., A Lighting Reproduction Approach to Live-Action Compositing, ACM Transactions on Graphics—Proceedings of ACM SIGGRAPH 2002, vol. 21, Issue 3, Jul. 2002, pp. 547-556.*
(Continued)

*Primary Examiner* — Charles Tseng
(74) *Attorney, Agent, or Firm* — Kilpatrick Townsend & Stockton LLP

(57) ABSTRACT

In some embodiments, methods and systems are provided for assisting a user in visualizing how a modified real-world setting would appear. An imaging device may capture a plurality of images of one or more objects or settings. A three-dimensional model of each object or setting may be created based on the images. These models may then be used to create a realistic image of a modified setting. For example, an image may display a setting (e.g., a living room) with an additional object (e.g., a couch) in the setting. The image may be realistic, in that it may accurately represent dimensions of the object relative to dimensions in the setting. Because three-dimensional models were created for both the setting and object, a user may be able to manipulate the image to, e.g., re-position and/or re-orient the object within the setting and view the setting from different perspectives.

29 Claims, 12 Drawing Sheets

(51) Int. Cl.
*G06T 15/20* (2011.01)
*G06T 19/20* (2011.01)

(56) References Cited

U.S. PATENT DOCUMENTS

| | | | |
|---|---|---|---|
| 2010/0208057 | A1 | 8/2010 | Meier et al. |
| 2010/0257252 | A1 | 10/2010 | Dougherty et al. |
| 2011/0169861 | A1 | 7/2011 | Suzuki et al. |
| 2011/0176007 | A1* | 7/2011 | Ding et al. ............ 348/189 |
| 2011/0216961 | A1 | 9/2011 | Ishige et al. |
| 2011/0219339 | A1 | 9/2011 | Densham |

FOREIGN PATENT DOCUMENTS

| | | |
|---|---|---|
| JP | 2004046326 A | 2/2004 |
| JP | 2004264907 A | 9/2004 |
| JP | 2009001104 A | 1/2009 |
| JP | 2011147125 A | 7/2011 |
| JP | 2011186536 A | 9/2011 |
| KR | 20100080386 A | 7/2010 |
| KR | 20110041383 A | 4/2011 |
| WO | WO-2004072908 A2 | 8/2004 |

OTHER PUBLICATIONS

Bunnun P., et al., "Interactive image-based model building for handheld devices", , Dec. 31, 2010, pp. 1-4, XP055051879, ISMAR workshop on augmented reality super models (2010), Retrieved from the Internet: URL:http:jjwww.cs.bris.ac.uk/Publications/Papers/2001337.pdf [retrieved on Jan. 31, 2013].

Hessendahl A., "Exclusive: Autodesk Brings AutoCAD to Android Phones and Tablets This Month", Apr. 12, 2011, pp. 1-4, XP055051966, Retrieved from the Internet: URL:http://allthingsd.com/20110412/exclusi ve-autodesk-brings-autocad-to-android-phon es-and-tablets/ [retrieved on Jan. 31, 2013].

International Search Report and Written Opinion—PCT/US2012/066622—ISA/EPO—Feb. 7, 2013.

Van Den Hengel A., et al., "In Situ Image-Based Modeling," Mixed and Augmented Reality, 2009, ISMAR 2009, 8th IEEE International Symposium on, IEEE, Piscataway, Nj, USA, Oct. 19, 2009, pp. 107-110, XP031568930, ISBN: 978-1-4244-5390-0.

Matsuda, K., "Evaluation of Personal Agent-Oriented Virtual Society-PAW," IEICE Transactions (J82-D-II) No. 10, Japan, The Institure of Electronics, Information and Communication Engineers, Oct. 25, 1999, pp. 1675-1683.

\* cited by examiner

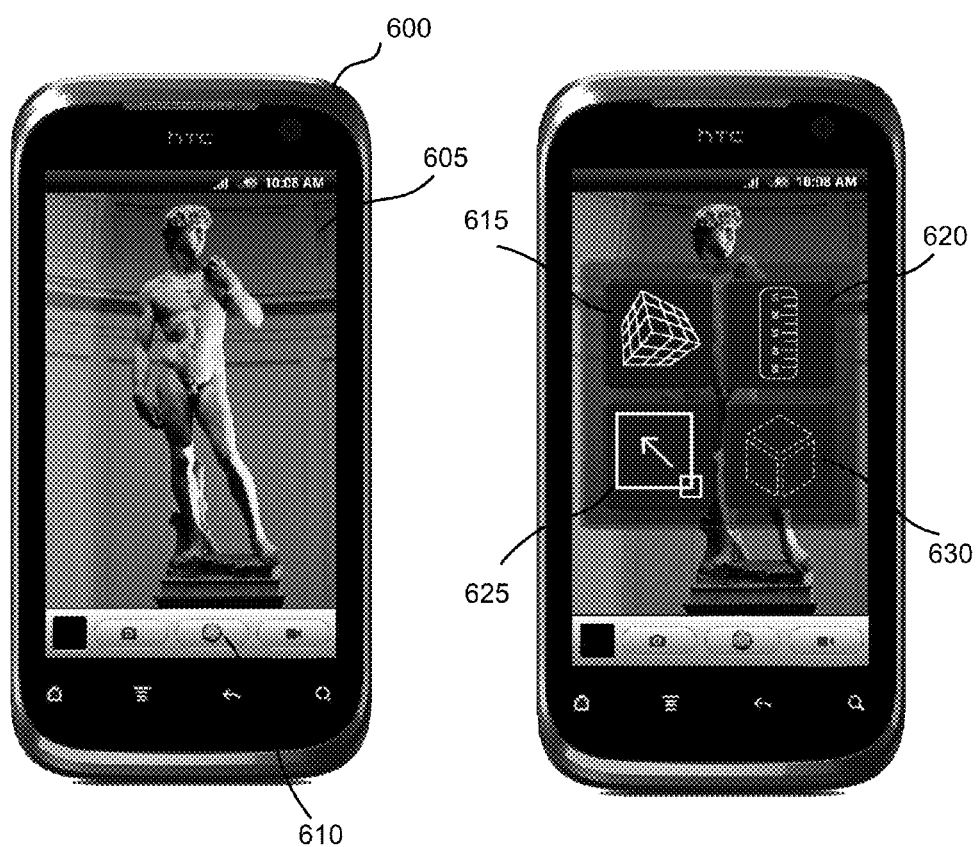
FIGURE 6A  FIGURE 6B

METHODS AND SYSTEMS FOR CAPTURING AND MOVING 3D MODELS AND TRUE-SCALE METADATA OF REAL WORLD OBJECTS

CROSS-REFERENCES TO RELATED APPLICATIONS

The present application is a non-provisional patent application, claiming the benefit of priority of U.S. Provisional Application No. 61/565,663, filed on Dec. 1, 2011, entitled, "METHODS AND SYSTEMS FOR CAPTURING AND MOVING 3D MODELS AND TRUE-SCALE METADATA OF REAL WORLD OBJECTS," which is hereby incorporated by reference in its entirety.

BACKGROUND

Envisioning objects in different settings is a difficult task, frequently encountered in various circumstances. For example, a potential purchaser may wish to envision how a couch displayed in a store would look in his living room. While he may like the color of the couch in the store, it may be difficult to envision how it would match other elements of the room.

SUMMARY

In some embodiments, methods and systems are provided for assisting a user in visualizing how a modified real-world or virtual setting would appear. An imaging device may capture a plurality of images of one or more objects or settings. A three-dimensional model of each object or setting may be created based on the images. These models may then be used to create a realistic image of a modified setting. For example, an image may display a setting with an additional object in the setting (e.g., augmenting a model of a real-world living-room setting with a new couch or augmenting a model of a virtual video-game setting with a real-world truck). The image may be realistic, in that it may accurately represent dimensions of the object relative to dimensions in the setting. Further, the image-based model generation may allow for accurate portrayal of the setting's and object's colors, textures, etc., such that the user may accurately envision a potential modification of the setting. Additionally, one or more models may include estimates of other physical properties (e.g., mass or density), such that, e.g., it may be estimated whether an object in a particular position is stable, whether it would crush another object, whether it could be moved given application of a particular force, etc. Because three-dimensional models may be created for both the setting and object, a user may be able to manipulate the image to, e.g., re-position and/or re-orient the object within the setting and view the setting from different perspectives. In some embodiments, the image capture, model creation, modified setting generation, and display of the modified setting are all performed on a single mobile device.

In some embodiments, provided is a method for presenting a representation of an augmented real-world setting using a mobile device. The method may include accessing first information indicative of a plurality of images of a real-world object and accessing second information indicative of a plurality of images of a real-world setting. The method may also include creating an object model of the object based on the first information and creating a setting model of the setting based on the second information. The method may also include receiving third information indicative of user input identifying a request that the setting be augmented and creating a modified setting model based on the object model and the setting model. The method may still further include presenting the modified setting model using the mobile device.

In some embodiments, provided is a method for sharing models of real-world objects. The method may include accessing first information indicative of a plurality of images of a real-world object. The method may also include creating a three-dimensional model of the object based on the first information and receiving second information indicative of user input identifying a request that the three-dimensional model of the object be shared with another user. The method may also include transmitting the three-dimensional model over a network to another mobile device.

In some embodiments, provided is a system for presenting a representation of an augmented real-world setting using a mobile device. The system may include an imaging device configured to capture images of a real-world setting and images of a real-world object. The system may also include a model generator configured to generate an object model of the real-world object based on the images of the real-world object and to generate a setting model of the real-world setting based on the images of the real-world setting. The system may further include a user input component configured to receive information indicative of user input identifying a request that the setting be augmented. The system may additionally include a model interactor configured to create a modified setting model based on the object model and the setting model and a display configured to present the modified setting model.

In some embodiments, provided is a system for presenting a representation of an augmented real-world setting using a mobile device. The system may include means for accessing first information indicative of a plurality of images of a real-world object and means for accessing second information indicative of a plurality of images of a real-world setting. The system may also include means for creating an object model of the object based on the first information and means for creating a setting model of the setting based on the second information. The system may further include means for receiving third information indicative of user input identifying a request that the setting be augmented and means for creating a modified setting model based on the object model and the setting model. The system may still further include means for presenting the modified setting model.

In some embodiments, provided is a computer-readable medium containing a program which executes steps of accessing first information indicative of a plurality of images of a real-world object and accessing second information indicative of a plurality of images of a real-world setting. The program may also execute steps of creating an object model of the object based on the first information and creating a setting model of the setting based on the second information. The program may further execute steps of receiving third information indicative of user input identifying a request that the setting be augmented, creating a modified setting model based on the object model and the setting model, and presenting the modified setting model.

In some embodiments, provided is a method for presenting a representation of an augmented real-world setting using a mobile device. The method may include accessing an object model of a real-world object based on the plurality of images of the object, the object model having been created based on a plurality of images of the object, and accessing a setting model of a real-world setting based on the plurality of images of the setting, the setting model having been created based on a plurality of images of the setting. The method may also include receiving information indicative of user input identifying a request that the setting be augmented, and creating a modified setting model based on the setting model and the object model. The method may further include presenting the modified setting model.

BRIEF DESCRIPTION OF THE DRAWINGS

FIGS. 6A-6B show examples of a user interface for interacting with a model creation and/or modification system.

DETAILED DESCRIPTION

In some embodiments, methods and systems are provided for assisting a user in visualizing how a modified real-world or virtual setting would appear. An imaging device may capture a plurality of images of one or more objects or settings. For example, multiple discrete images (e.g., pictures) may be captured, or a video may be captured and multiple frames may be identified (e.g., all frames may be automatically extracted, regularly spaced frames may be extracted, or frames with features such as distinguishability, clarity, etc. may be extracted). A three-dimensional model of each object or setting may be created based on the images. These models may then be used to create a realistic image of a modified setting. For example, an image may display a setting with an additional object in the setting (e.g., augmenting a model of a real-world living-room setting with a new couch or augmenting a model of a virtual video-game setting with a real-world truck). The image may be realistic, in that it may accurately represent dimensions of the object relative to dimensions in the setting. Further, the image-based model generation may allow for accurate portrayal of the setting's and object's colors, textures, etc., such that the user may accurately envision a potential modification of the setting. Additionally, one or more models may include estimates of other physical properties (e.g., mass or density), such that, e.g., it may be estimated whether an object in a particular position is stable, whether it would crush another object, whether it could be moved given application of a particular force, etc. Because three-dimensional models may be created for both the setting and object, a user may be able to manipulate the image to, e.g., re-position and/or re-orient the object within the setting and view the setting from different perspectives. In some embodiments, the image capture, model creation, modified setting generation, and display of the modified setting are all performed on a single mobile device.

Figure 1:
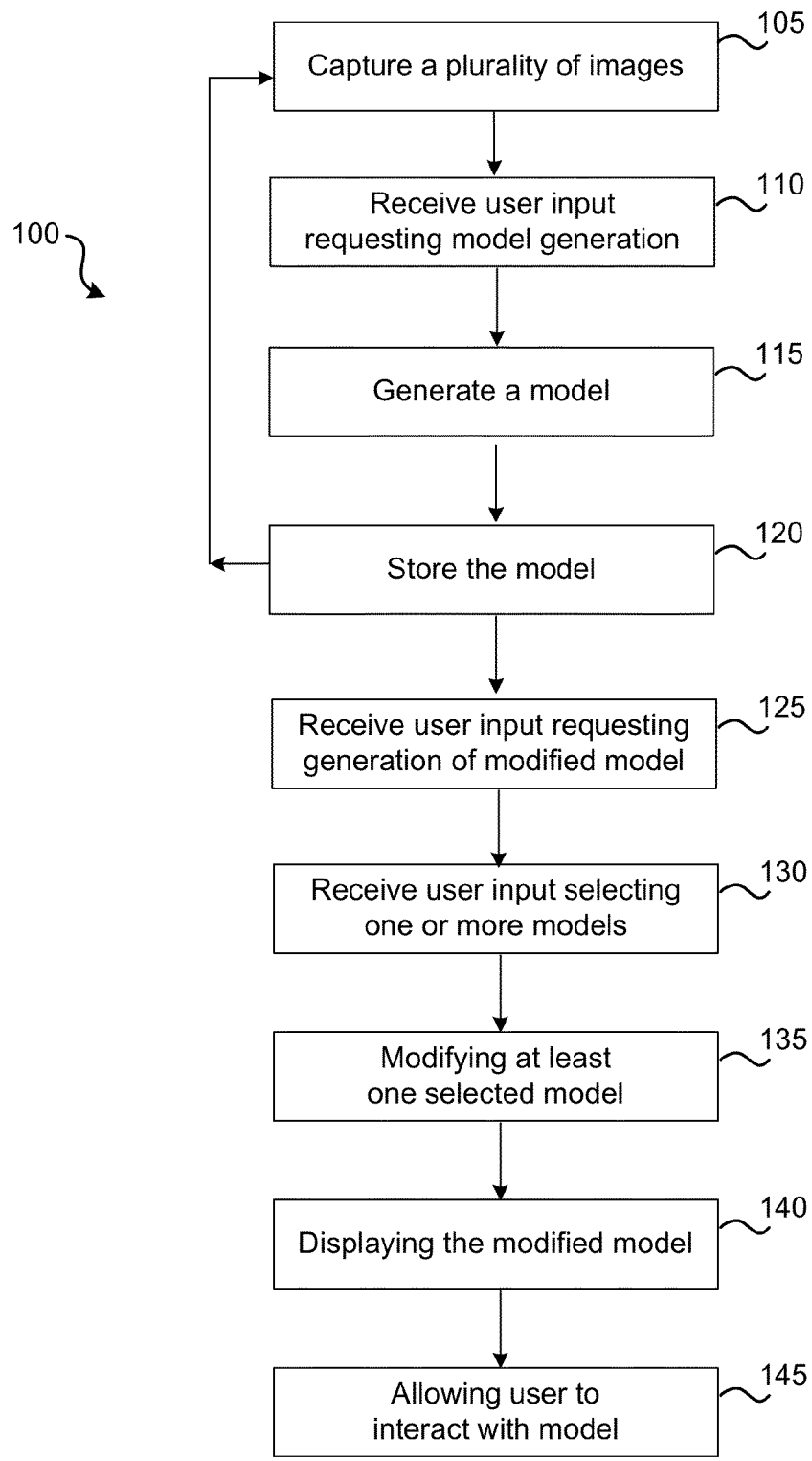
FIG. 1 illustrates a method for allowing a user to visualize a modified realistic setting according to one embodiment.

FIG. 1 illustrates a method 100 for allowing a user to visualize a modified, realistic setting according to one embodiment. At 105, a plurality of images are captured. The images may include digital images or non-digital images. The images may be captured by a camera (e.g., a camera on a mobile device or mobile phone) or other imaging device. The plurality of images may all include a single object, multiple objects and/or a setting. The plurality of images may be captured at different perspectives. The plurality of images may include at least 2, at least 3 or more images. In some instances only a single image is captured. In some instances, a video is captured, which may be converted into a plurality of images.

In one instance, a system determines or suggests a number of images to be captured. A user may then be instructed to capture the number of images (e.g., via a display on a mobile device). The system may recommend a fixed or dynamic number of images. For example, more images may be recommended or required if the captured object or setting is large or complex, previous image quality was poor, previous images do not capture substantial portions of the object or setting (e.g., due to zoom, image overlap or image perspective), etc. A system may instruct or advise a user as to what types of images to take (e.g., "Capture image of back of object"). In one instance, a user determines how many and/or what types of images to capture. The user may be informed that capturing more details of all or part of an object may improve estimation of a subsequently generated model. In one instance, a user input (e.g., a number of captured images, a setting, etc.) may specify a degree of detail in a model and/or a processing effort (e.g., a computational processing effort to create and/or use the model). The user input may comprise a balance between the degree of detail and the processing effort.

Generally, with proper image-capturing quality and diversity, capturing additional details may allow a subsequently created model to include additional detail about the visual appearance and/or structure of an imaged model or setting. However, processing requirement, storage space, and image-capturing time may also increase with additional image-capturing details. A system and/or a user may adjust a required or suggested image-capture number based on desired detailed, processing speed, model objectives, etc.

At 110, a user input requesting model generation is received. In some instances, the input is received after the plurality of images are captured. For example, a device may capture three images, a device may store the images, the user may select the images, and the user may indicate that a model is to be created based on the images. As another example, a device may capture two images, and a user may then indicate that a model is to be created based on the recently captured images. In some instances, the input is received before the plurality of images are captured. For example, a user may select a model-generation option and proceed to capture images using the device. In some instances, multiple inputs are received (e.g., one input requesting model selection before the images are captured and a second input identifying an object within the images to model). The input may include a type of model to be created (e.g., a setting or an object). The input may identify a particular object within one or more images to be modeled. For example, a user may point to (e.g., via a mouse, touch screen or arrow selection) an object in an image or a user may draw a border around an object in an image.

At 115, a model may be generated using the plurality of images. Some or all of the plurality of images may be used. For example, images of poor image quality or substantially duplicative of other images may be excluded. In some instances, at least two or at least three images are used to generate the model. As described in further detail below, the model may be generated at least partly based on the plurality of images and/or intrinsic imaging-device parameters (e.g., focal length, skew coefficient, distortions, principal point, etc.). The model may include a model of one or more objects and/or a setting. In some instances, a model of a setting includes models of one or more objects. For example, a model of a living room could include models of a couch, coffee table, light and television; estimates of distances between the objects, room dimensions, etc. The type of model generated may be based on user input (e.g., indicating a type of model), image properties (e.g., how many objects are present within captured images), etc.

At 120, the model may be stored. The stored model may include, e.g.: a realistic three-dimensional representation of one or more objects, estimates of real-world dimensions of the model, a name associated with the model, a graphical representation associated with the model (e.g., one view of the object), model-generation parameters, identifications of images used to generate the model, a time of model generation and/or image capture, etc.

The model may be stored in a database. In some embodiments, a plurality of databases exists, such as an object database and a setting database. The model may be stored in one of the plurality of databases, a selection between databases being based on, e.g., a user input, a type of model created, etc. For example, user input received at 110 may request generation of a model of an object. The generated model may then be stored in an object database. In some embodiments, a single database exists. In one example, a setting database includes parameters identifying objects within an object database as being in a setting, inter-object distances, object locations, setting parameters (e.g., room size, wall color, carpet texture, etc.).

A user may be able to view, add and/or delete models stored in one or more databases. For example, a user may be able to view representations (e.g., icons or names) of all models stored in an object database and delete particular model objects. In some instances, users may be able to view and/or approve the generated model before or after it is stored. For example, a user may be able to view a representation of a model object and rotate it. If the user is not satisfied with the model, particular inputs may indicate how the model is to be improved (e.g., to specify a length of a couch, alter a color, etc.), or the user may capture alternative or additional images to allow generation of a new model.

As shown in FIG. 1, a plurality of models may be generated and/or stored (e.g., by repeating 105-120). Thus, a database of multiple models (e.g., at least one setting model and/or at least one object model) may be generated.

While FIG. 1 illustrates a technique for generating and storing models based on images captured by a user, models may also or alternatively originate in other manners. For example, a system may have one or more default models (e.g., "couch", "living room", "Corvette", etc.). Models originating from other users' images or from other users' codes may be received (e.g., over a wireless network).

At 125, user input requesting generation of a modified model may be received. The requested modification is different from the above-described user-requested model improvement. The model improvement relates to improving a model's accuracy, while model modification does not. For example, model modification may include altering a setting model to include an additional object (that was not present in the setting-related images) in the setting, removing an object from the setting, moving an object within the setting, exchanging one object within the setting with another object, etc. The user input received at 125 may include, e.g., receiving a user input requesting a particular type of modification (e.g., "modifying setting to include additional object"), a general modification ("modify setting"), etc.

At 130, user input(s) selecting one or more models is received. For example, a user may select a setting to be modified, an object to be added to a setting, an object to be removed from a setting, an object to be moved within a setting, etc. In one instance, a user is presented with representations (e.g., textual or graphical representations) of objects and/or settings to allow for the selection. For example, after a user indicates that he wishes to add an object to a setting, visual representations of setting models and object models may be presented to the user (e.g., via a device display) to allow for selection of a setting and object. As another example, after a user indicates that he wishes to move an object within a setting, he may be presented with representations of setting models, and thereafter presented with (independent or within-a-setting) representations of objects within the setting to allow for selection of an object within the setting to be moved.

In one instance, a user may select a setting model (e.g., for augmentation, object removal, object translation, etc.). In one instance, the setting model is set to a default. For example, a user may be playing a video game. The video game may include a setting which may be augmented with a real-world object. The user may then select a model of a real-world object (e.g., originating from his images, received from another user over a wireless network, etc.), and the object may be added to the virtual setting.

Additional user inputs may be received. For example, a user may be able to identify a location within a setting at which to insert an object. A user may be able to rotate an object prior to or after inserting it into the setting. A user may be able to identify a final-destination point within a setting to move an object to, or may drag an object from a first location to another.

At 135, at least one of the selected models (e.g., a setting model) may be modified in accordance with user inputs. The modified model may include a realistic representation of how the model would look should the modification occur in real life. For example, if a first object model was created of an eight-foot-long couch, and a second setting model was created of a living room having a seven-foot space between a wall and a doorway, modified living-room setting model that included the couch should reflect that the couch could not fit if oriented length-wise between the wall and the doorway. As another example, if a virtual default mock battlefield model may be augmented to include a model of a user's shoe, such that a user may then be able to throw his shoe in a video game.

At 140, the modified model may be displayed. The display may include a two-dimensional representation of the model. The display may include a warning to a user when a requested modification is not possible (e.g., inserting a large object into a small setting). The display may include a visual estimate of how a setting would look upon a modification. The display may also include non-realistic and/or textual features (e.g., indicating distances between various objects within a setting).

At 145, a user may be allowed to interact with the modified model. For example, the user may be able to rotate the displayed modified model, such that a new perspective of the model is shown. The user may be able to move (e.g., slide, throw, drop) objects within the modified model, remove objects from the modified model, change colors (e.g., wall paint) within the modified model, etc. The user may further be able to save or delete a modified model.

In some instances, 130-145 are combined in a dynamic and fluid process. For example, a user may select a setting model to be modified. A relatively large representation of the setting may be displayed. Small representations of object models may be displayed next to a larger representation of the selected setting model. The user may then be able to drag and drop objects into the setting, drag and drop objects from the setting, move objects within the setting, etc.

In some embodiments, original and/or modified models may be transmitted, e.g., over a network (e.g., a wireless network). In some instances, one or more model(s) may be sent to one or more Internet sites and/or shared with other users. For example, models may be transmitted to be posted onto a file-sharing site, a social networking site, an auction site (e.g., Craigslist), a sales site (e.g., www.amazon.com), etc. Similarly, users may be able to download models. For example, a user may visit a furniture store website. He may then be able to download a model of a couch to a computer or mobile device. The object may then be used to modify a setting model (e.g., to estimate how the couch would look in the user's own living room). As another example, a group of users may be involved in playing a video game. Each user may be allowed to create models of real-world objects, and the models may be exchanged over a wireless network (e.g., for free, for free if the users are on a team, for payment, only with permission, etc.). The game may be configured to augment settings with modeled objects.

Figure 2:
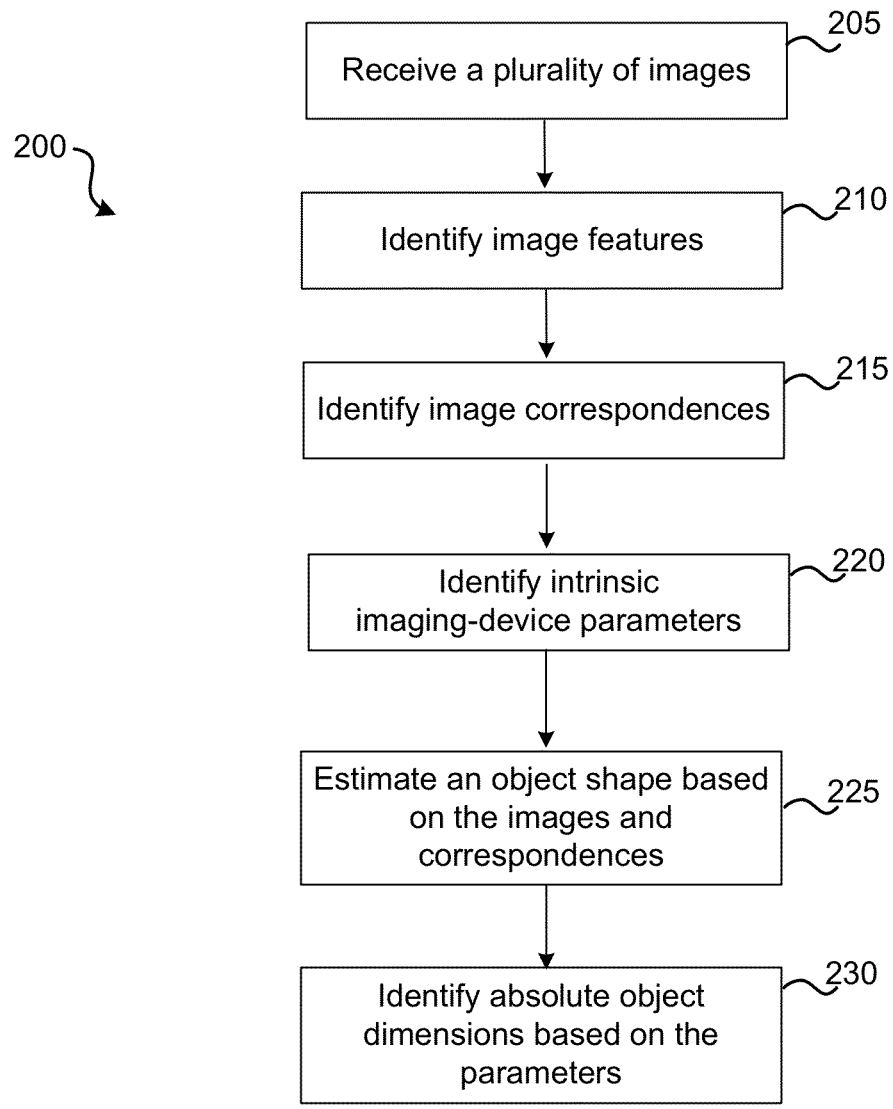
FIG. 2 illustrates a method for generating a model in accordance with an embodiment.
Figure 3A:
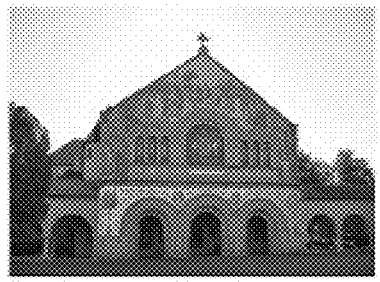
FIGS. 3A-3C show examples of identifying and matching features across images.

FIG. 2 illustrates a method 200 for generating a model in accordance with an embodiment. At 205, a plurality of images is received (e.g., over a network and/or from a local or remote database). These images may include images, such as those captured at 105. The images may each include a partial or full depiction of one or more objects or settings. The images may be at different perspectives. The plurality of images may include at least or exactly two or three images. A number of images may be fixed or dynamic and/or determined by a user or a system, as described with respect to 105 in FIG. 1. FIG. 3A shows an example of one image of a church object.

At 210, image features may be identified. In some instances, identifying image features includes processing one or more images. For example, an image may be filtered, cropped, etc. Image features may then be detected as portions of the image that exhibit high or above-threshold spatial contrast, are separated from other features, exhibit distinctive pixel intensities compared to other pixel intensities in the image, exhibit distinctive spatial pixel-intensity patterns compared to other pixel-intensity patterns in the image, include straight lines, etc. Image features may include a one or more qualitative types of features. For example, one or more features may correspond to an edge, distinctive texture, corner, color pattern, distinctive color, etc. In some instances, image features are not associated with any particular type of qualitative feature. Computer vision techniques and/or quantitative pixel analysis may be used to identify features.

Figure 3B:

In some instances, each of a plurality of portions or regions of the image are characterized using a multi-dimensional space. Thus, for example, a first dimension may identify intra-region contrast, a second dimension may identify average relative pixel intensity, etc. The regions may be of the same or different shapes (e.g., circles) or size, and may or may not be overlapping. The most distinctive regions may be identified based on an analysis within the multi-dimensional space. FIG. 3B shows an example of one image with identified features (each outlined in red).

Figure 3C:
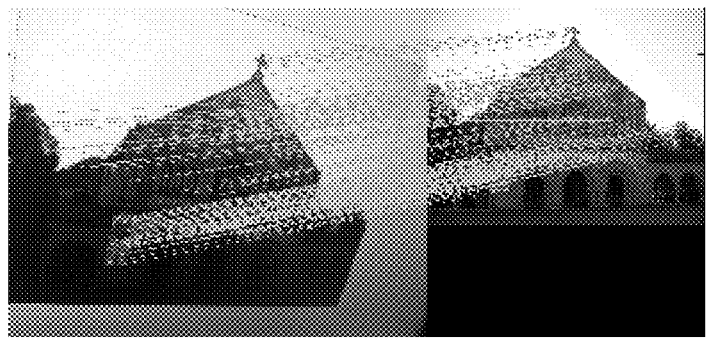

At 215, image correspondences may be identified. The image correspondences may be identified in an attempt to identify a same real-world feature present in multiple images. Identifying image correspondences may include, e.g., identifying image features in each of a plurality of images and matching one or more of the features. The feature may not be present at the same location within the image, e.g., if the images were captured at different perspectives. Thus, image features may be matched based on an analysis of feature qualities (e.g., identifying similar spatial patterns in multiple images). In some embodiments, images may be processed to, e.g., have similar brightness, scale, etc. FIG. 3C shows an example of identified image correspondences. Specifically, the depicted lines are shown as connecting a feature in one image with a corresponding feature in another image.

At 220, intrinsic imaging-device parameters (e.g., a camera's focal length, lens distortion, skew coefficient, principal point) may be estimated. These may be known properties. For example, these parameters may be stored and associated with each of the received images. As another example, a device performing method 200 may be the same device that captured the images and may know the parameters used when capturing the images.

At 225, an object shape may be estimated based on the images and correspondences. The shape may include a partial or complete three-dimensional shape that includes realistic proportions. The shape may be estimated by accounting for different perspectives of the images. For example, a camera may be tilted and at a different height while capturing a first image compared to its position at a second image. Upon identifying image correspondences, the perspective may be estimated to allow for an estimation of realistically proportioned object shape. In one instance, a transformation is estimated for each of the plurality of images. The transformation may allow for the two-dimensional image to be transformed into a three-dimensional image space. The transformation may be calculated at least partly on the identified image correspondences and/or intrinsic imaging-device parameters. In some embodiments, 225 involves a triangulation technique.

At 230, real-life object dimensions may be identified based on the parameters. In some embodiments, a three-dimensional model is created in an image space. The image space may then be converted to a real-life or absolute space based on the parameters. For example, by identifying a camera's focal length, one or more realistic dimensions of an object may be estimated. Specifically, an imaged dimension at a sensor may be approximated as a focal length multiplied by an actual object dimension divided by a lens-to-object distance. Thus, by using the focal length and a plurality of objects showing the object, the actual object dimension may be estimated. A similar technique may allow for an estimation of a magnification or scaling factor that may be applied to multiple dimensions of a three-dimensional shape estimated at 225.

Images may include a plurality of objects. Thus, in some embodiments, 225 includes identifying distinct objects within the images. For example, each image may be analyzed to identify objects in the image. Objects that are represented in a sufficient number of images may then be modeled (e.g., by estimating the object's shape and dimensions). In some instances, objects are modeled regardless of how many images show the object. A confidence measure may be associated with each model, e.g., to indicate that a model based on a single image is not likely accurate. This may be particularly advantageous when a user is interested in modeling a complex setting and is not interested in a detailed account of each object in the setting.

Method 200 may further include estimating other object properties, such as a general color, a spatial color distribution, a texture, etc.

Figure 4:
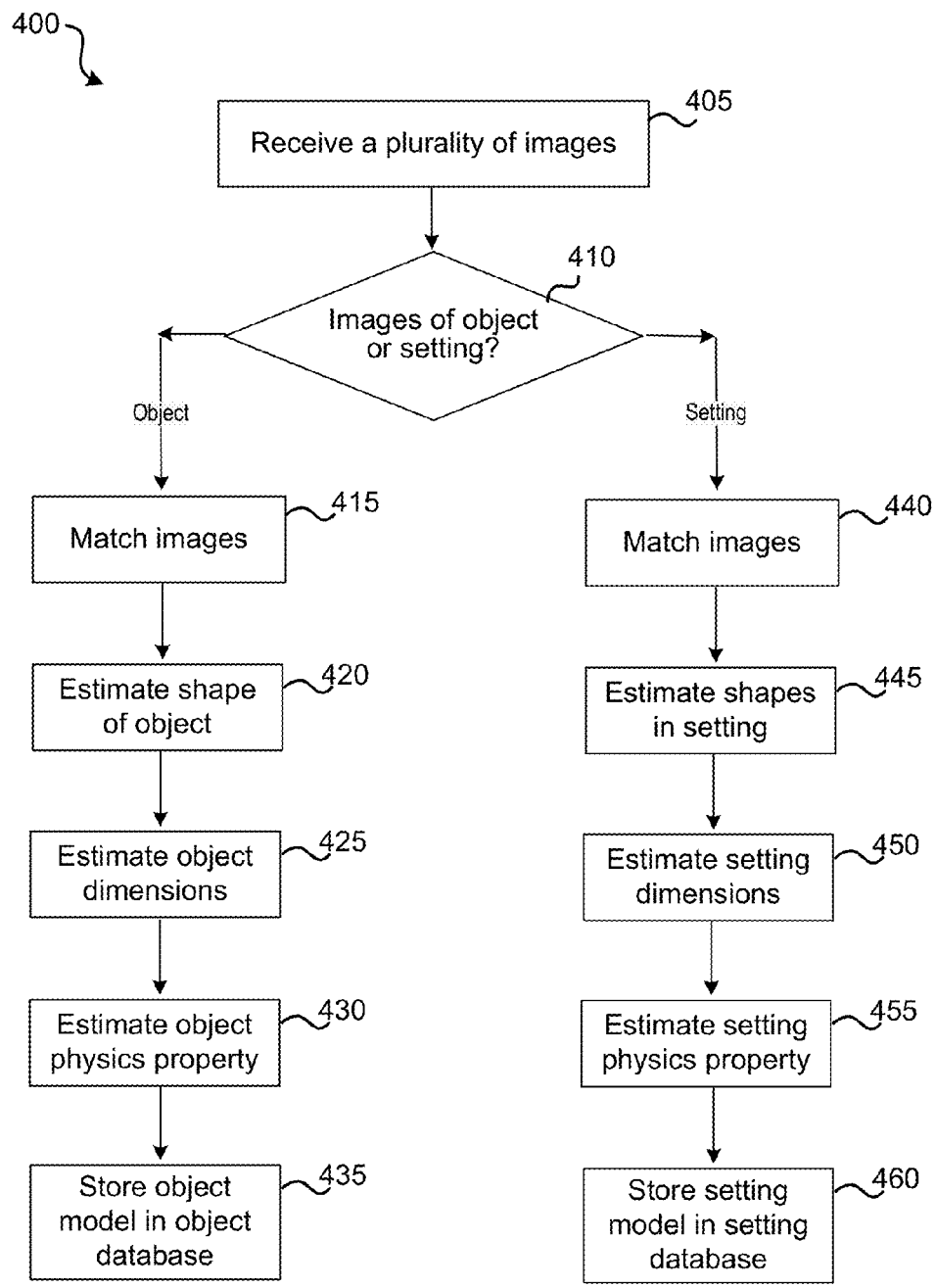
FIG. 4 illustrates a method for generating one or more models in accordance with an embodiment.

FIG. 4 illustrates a method 400 for generating one or more models in accordance with an embodiment. At 405, a plurality of images is received. These images may include images, such as those captured at 105. The images may each include a partial or full depiction of one or more objects or settings. The images may be at different perspectives. The plurality of images may include at least or exactly two or three images. A number of images may be fixed or dynamic, as described with respect to 105 in FIG. 1.

At 410, it may be determined whether the images are of an object or a setting. This determination may be made partly or fully based on user input (e.g., characterizing the images as "object" or "setting" before or after capture; characterizing the images with object-type or setting-type descriptors, such as "living room" or "table"; etc.). This determination may be made partly or fully based on image analysis. For example, if an edge-detection algorithm estimates that a single object consumes a large percentage of one, more or all of the photographs, it may be determined that the images are of an object, or if center pixels or a majority of pixels are rather consistent (e.g., in color, texture, etc.), it may be determined that the images are of an object.

If it is determined that the images are of an object, method 400 continues to 415, at which the images are matched. Specifically, each of one or more object features may be detected in one, two or more of the images. For example, it may be determined that a top of an object extends from pixel (5,5) to pixel (5,505) in a first image and from pixel (10,15) to pixel (20,395) in a second image. Object features may include non-qualitative pixel groupings and/or one or more of, e.g., edges, distinctive textures, corners, etc.

Based at least partly on the matched images, a shape of the object may be estimated at 420. The shape may include a three-dimensional shape. The model may be realistically proportioned. For example, if a sofa was three times as long as it was wide, a model of the sofa may represent this characteristic.

At 425, object dimensions may be estimated. The estimated dimensions may be realistic. For example, if a couch was seven-feet long, the model may include a similar length. In some instances, the estimated dimension includes estimating one or more scaling factors to be applied to the shape estimated at 420. The dimensions may be estimated based at least partly on parameters intrinsic to an imaging device that captured the plurality of images. For example, camera-intrinsic properties and/or camera settings (e.g., focal length, lens distortions, skew coefficient, principal point, etc.) may be used to convert an imaged dimension into a real-life dimension. In some instances, real-world dimensions are not estimated. For example, dimensions may instead be estimated (e.g., based on camera-intrinsic properties) only within an image space.

At 430, other, non-dimensional physics-related properties of the object may be estimated. For example, a mass or density of the object may be estimated. The physics-related properties may relate to a requisite force required to move or lift the object, a crushing property of the object, etc. The physics-related properties may be estimated, e.g., based on an estimated material of the object (e.g., estimating that an object is made from wood based on an imaged surface), database matching, and/or user inputs. For example, a user may input that an object is made from aluminum. A mass of the object may be estimated by looking up a density of aluminum and estimating a volume of the object based on the shape and dimensions estimated at 420 and 425. As another example, an object database may include shapes and materials of a plurality of objects. Thus, an imaged object may be identified as corresponding to one of the database objects, e.g., based on its shape and color, and the material may then be looked up in the database. The database may include all types of objects, or separate databases may be used for different types of objects.

At 435, the object model may be stored in a database. The model may include a plurality of corner points, edges, surfaces, colors, textures, borders, dimensions, a scaling, a weight, a density, etc. The stored model may include one complete three-dimensional model. (e.g., including both the estimated shape and real-world dimensions). For example, a model of a couch may include the couch's shape, along with an indication that a flat base of the couch is eight feet long, a front portion of the couch is two feet tall, a cushion of couch is one-foot deep, etc. The stored model may include multiple components (e.g., one component representing the object's shape and another representing a scaling factor that can be applied to the shape to convert it to real-world dimensions). The stored model may also include a confidence indicator, which may indicate that the model may not accurately reflect dimensions, textures, etc., or that the model does not fully reflect all portions of the object. For example, if the images at 405 were of poor quality or did not include a depiction of a back of an object, a confidence indicator associated with a model may be low.

Returning to 410, if it is determined that the images are of a setting, method 400 continues to 440. At 440, the images are matched. The matching performed at 440 may include one or more techniques such as those described at 415. In some instances, matching techniques are the same or similar at 415 and 440. In some instances, the matching at 440 comprises matching features from each of a plurality of intra-setting objects across images. Setting borders (e.g., floors, walls, ceilings, ground, etc.) may be matched across images at 440. Thus, in some embodiments, matching images includes identifying one or more objects and/or borders within the setting and matching the objects and/or borders across images.

At 445, shapes within the setting are estimated. The shapes may include shapes of objects or borders within the setting. Each object shape may include one or more three-dimensional shapes. Border shapes may include a two dimensional shape and an orientation. For example, it may be estimated that a wall is rectangular with a 3-by-4 aspect ratio and vertical relative to a floor.

At 450, setting dimensions may be estimated. Setting dimensions may include object dimensions (e.g., as described at 425). Setting dimensions may include inter-object distances and/or inter-object orientations (which may be a more compact way of representing a great number of distances from one object to another).

At 455, one or more setting physics-related properties may be estimated. For example, a mass, density, rigidity or sparcity of one or more objects in the setting may be estimated (e.g., as described at 430).

At 460, the setting model may be stored in a setting database. The setting database may be partly or fully independent from the object database. In one instance, each object within a setting is independently modeled and stored in an object database. A setting database may then store additional data, such as indications of which objects were associated with a particular setting, inter-object distances, border shapes, etc. Stored setting-model data may include a confidence indicator, such as the one described above in relation to the object model database.

In some embodiments, the determination at 410 is not included in method 400. For example, all images may always be analyzed as though they depict a setting. One or more objects may be identified within the setting and independently modeled. Setting data additional to the object data may be further determined and/or stored. As another example, all images may always be analyzed as though they depict an object. This may be particularly desirable in circumstances in which default setting models are already created (e.g., a video-game programmer created setting models, and users only have the capability of augmenting the settings with one or more objects).

Figure 5A:
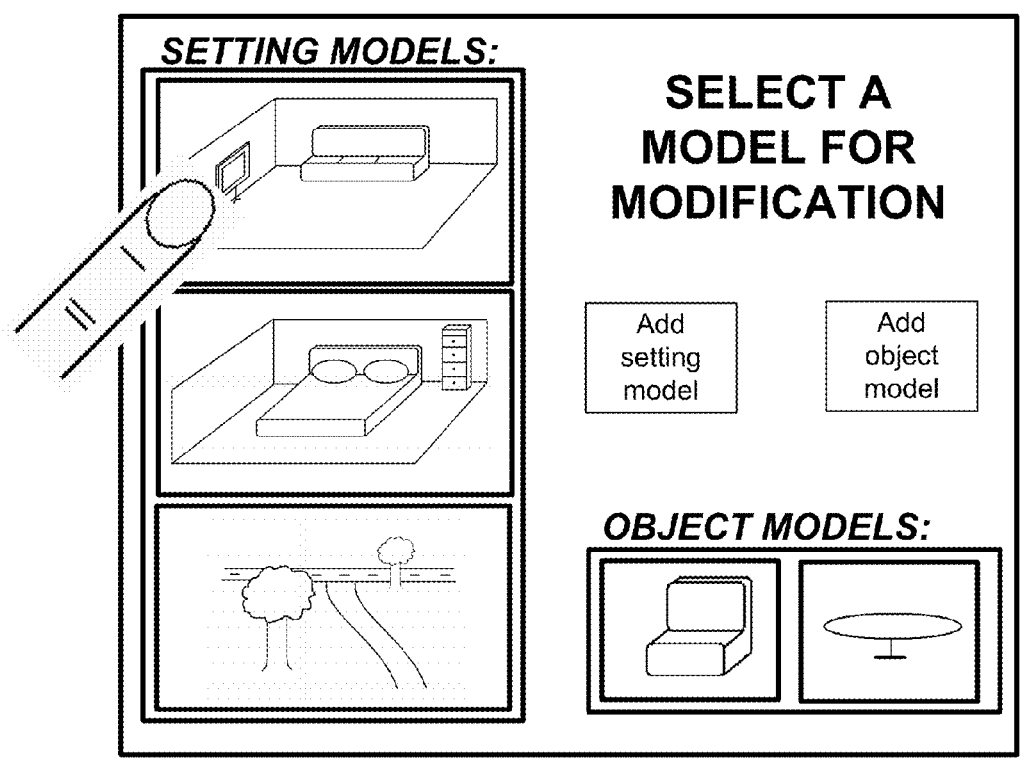
FIGS. 5A-5C show examples of a user interface for augmenting a setting model with a new object.
Figure 5B:
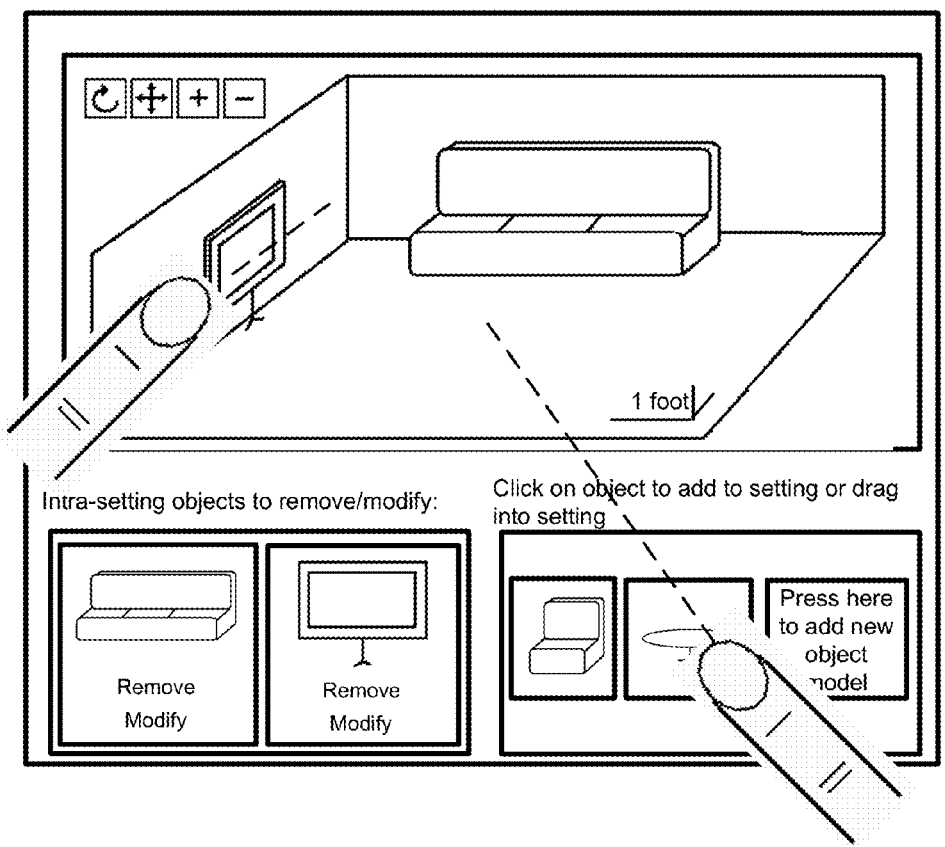
Figure 5C:
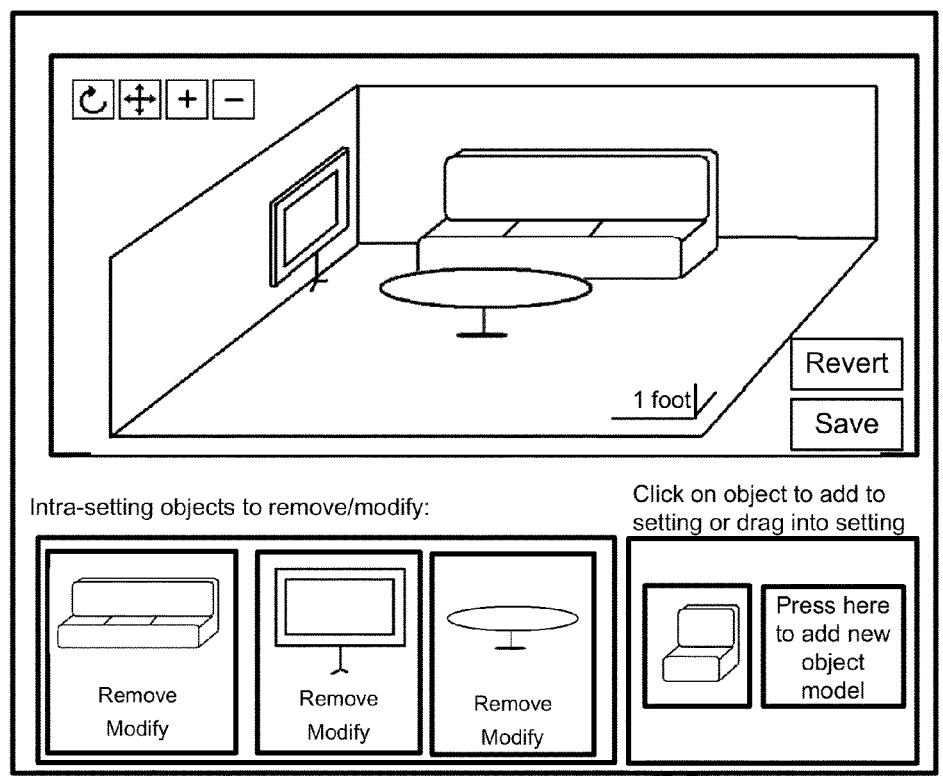

FIGS. 5A-5C illustrate a user interface that may be used to present models to users and/or allow users to interact with the models via a device.

In FIG. 5A presents a menu screen to the user. Representations of a plurality of setting models are presented to the user. As shown, the representations include a two-dimensional graphical representation of a setting or object. The representation may include, e.g., a raw image used to create a model of an associated setting or object, a two-dimensional depiction of the setting or object, a textual description of the setting or object (e.g., "Living Room" or "Setting 1"), etc. In some instances, all models are presented in a similar manner. In some instances, object and setting models are separately presented. In some instances, only setting models are presented. The user may be able to select a model, e.g., by clicking on a model representation using a mouse or pointer, by selecting a setting using device keys (e.g., arrows), by touching the screen where the setting is represented, etc. The user may be presented with other options (e.g., to combine models, add one or more models, delete a model, rename a model, etc.). FIG. 5A shows an example of a user selecting (by touching an associated image) one of the presented setting models.

In FIG. 5B, an expanded representation of the setting is presented to the user (e.g., in response to selection of the particular setting model). The user may be able to interact with the setting, e.g., by rotating the setting, zooming in or out from the setting, changing wall colors, changing carpets, etc. One or more scale bar(s) and/or virtual measuring devices may be provided, such that a user may identify setting dimensions or intra-setting object dimensions and/or inter-object distances.

The user may further be able to modify three-dimensional aspects of the setting. For example, three-dimensional objects in the setting may be moved and/or re-oriented, new three-dimensional objects may be added to the setting, three-dimensional objects may be removed from the setting. FIG. 5B shows an example of a user moving a television set within the setting, by touching the television and dragging it to a desired destination.

FIG. 5B also shows an example of a user indicating that a coffee-table object is to be added to the setting. In this instance, the user is dragging a representation of the object into the setting. In some instances, the user may add the object to one or more default locations (e.g., a center location or an empty location) by merely selecting (e.g., tapping on or clicking) the representation of the object.

In some instances, a user specifies a location for a new object to be positioned or a new position for an object already displayed in the setting. The user may input three-dimensional coordinates (e.g., real-life coordinates in a room) to specify a location of a part (e.g., a center, corner, base, etc.) of an object. In another instance, the user specifies two-dimensional coordinates. For example, the user may identify a position within the two-dimensional depiction of a setting (e.g., by touching or clicking on a positioning). It may be assumed that the user intended for the object to be placed such that a base of the object is resting on a ground or floor of the setting. It may further be assumed that the identified location is a location for a base or center of the object. In some instances, a user drags an object across or into a setting. Thus, a user clicks on a first part of an object and drags it to a position in the setting. The final position may be the position at which the first part of the object is to be located. For example, if a user selects a top of a coffee table and drags it into the setting, the setting may be modified such that a base of the coffee table rests on a floor in the setting, and that the selected top-of-the-coffee-table point is at the final-destination point.

As shown, the user may also be able to remove objects in the setting (e.g., by dragging them out of the setting or selecting a remove option specifically associated with each intra-setting object. Removing objects from a setting or moving objects within a setting may include extrapolating a portion of the setting. For example, if the couch is removed from the setting in FIG. 5B, it may be predicted what the floor of the setting looks like under the couch, even though no image specifically provided this information. In some instances, this extrapolation was performed prior to any user modification. For example, generation of the setting model may include estimating a base setting environment (relying on estimations and/or extrapolations of unavailable setting portions) and generating individual object models in the setting.

The user may be able to modify models of objects in a setting. For example, the user may be able to intentionally resize or recolor an object to a non-realistic size or color, such as expanding a seven-foot couch to be an eight-foot couch.

In some embodiments, the objects and/or settings presented (e.g., as being in the setting or additional objects) may be objects modeled based at least partly on images provided by the user, by the device, or processed by the device. That is, for example, the objects may be specific objects (e.g., of a specific type/style/size/make of couch of interest to a user) rather than a general object. As further examples, a living room setting may include specific carpeting, wall decorations, etc. as a user's living room. In some embodiments, the presented objects additionally or alternatively include more generic models not based on images provided by the user, by the device or processed by the device. For example, a generic couch or living room may be presented. The user may be able to customize these generic objects and/or settings (e.g., by varying dimensions, colors, etc.) and interact with them as described above for the image-based objects and/or settings.

In FIG. 5C, a modified representation of the setting is presented to the user. In this instance, in response to the user actions shown in FIG. 5B, the modified setting includes a coffee table that was not actually present in the setting at the time corresponding model-generation images were captured, and a modified location of the television set compared to its actual location at the time corresponding model-generation images were captured. The user may be able to save the modified setting, revert to an unmodified setting, interact with the setting (e.g., rotating the setting, zooming in, add additional objects, remove objects, move objects, etc.), etc.

FIGS. 6A-6B show other examples of a user interface for interacting with a model creation and/or modification system. As shown, portable electronic device 600 may include a display 605 which may show images. The images may include images captured by the device. The device may include a model-program option 610.

When a user selects the model-program option (e.g., by touching an associated visual icon on the screen), one or more options may be presented to the user, as shown in FIG. 6B. For example, a model generation option may be presented (e.g., by displaying a model-generation icon). Selection of this option may cause a processor to generate a model of one or more objects being displayed in the image. In the instance shown in FIG. 6B, a model may be generated of the statue.

A measurement option may be presented (e.g., by displaying a measurement icon 620). Selection of this option may cause a processor to determine a measurement of a dimension in the image and/or to display the measurement. For example, a dimension of an object being displayed may be presented (e.g., a height and/or width of the statue David). In some instances, selection of this icon will allow a user to identify a dimension that he wishes to measure (e.g., by selecting end points on a screen). In some instances, a virtual ruler will appear on the screen to allow the user to measure dimensions in the image.

An augmentation option may be presented (e.g., by displaying an augmentation icon 625). Selection of this option may allow the image or a setting (e.g., being imaged) to be modified to include an additional object. For example, the device may store a model of one or more objects. A user may select an object. The setting in the image may also be modeled. The setting model may then be augmented to include the object, and the augmented model may be displayed to the user.

An object-removal option may be presented (e.g., by displaying a removal icon 630). Selection of this option may cause one or more objects to be removed from a setting or image. For example, a user may be able to click on an object or shape a virtual box around an object to indicate that it should be removed from the setting. A model of a setting may be modified to remove the identified object, and the modified model may be displayed to a user.

Figure 7:
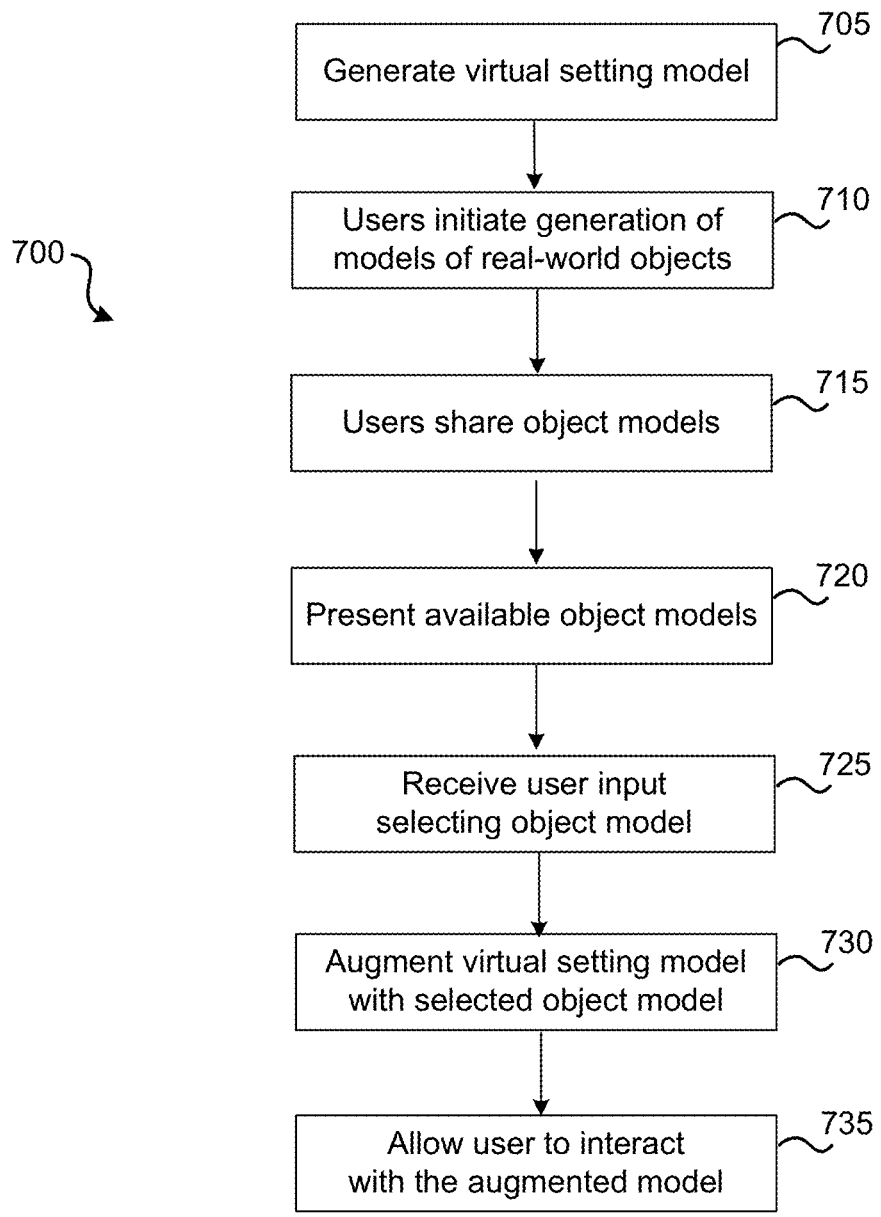
FIG. 7 shows a method augmenting a virtual setting model in accordance with an embodiment.

FIG. 7 illustrates a method 700 for augmenting a virtual setting model in accordance with an embodiment. At 705, a virtual setting model is generated. The virtual setting model may include a video-game setting, such as an imaginary town, building, room, battlefield, etc. The virtual setting model may include a plurality of inanimate objects. In some instances, the virtual setting model also includes one or more animate objects, such as video game characters (e.g., user characters, enemy characters, etc.). The virtual setting model may be characterized by a plurality of dimensions (e.g., scene dimensions, intra-setting object dimensions, etc.). The dimensions may be at least reasonably real world, such that if the setting model is augmented with another real-world object model, the relative dimensions are sensical. Inanimate and/or animate objects in the virtual setting may be associated with physics-related properties, such as a mass, density, strength, rigidity, etc.

At 710, one or more users may generate one or more models of real-world objects. The models may be generated, e.g., using a technique as described herein. For example, a user may capture one, two or more images of a real-world object, and a model may be generated based on the captured image(s).

The object models may be stored on a user device and/or on a remote server. The object models may or may not be uniquely associated with a user that initiated their generation. In some instances, at 715, users may share one or more object models. The sharing may occur after a user initiates the sharing and/or automatically. For example, models may be automatically shared across team members. Sharing of object models may or may not require permission by a user and/or payment to a user or system. Object models may be shared over a network. For example, a website (e.g., a social networking website) may allow users to share object models. The website may or may not be owned or controlled by a video-game company.

In some instances, sharing a model is itself an end objective. For example, instead of telling someone that you are considering purchasing a car, or sending the person a picture of a car, the model may be sent to the person. This may improve the receiver's understanding of the subject object. Thus, it may be used as a superior and more detailed substitution for sharing a picture. In some instances, the receiving person may himself use the received model of the object. For example, the model may be used for 3D printing or as a manufacturing specification. As other examples, the receiving person may interact with the model.

At 720, available object models may be presented to a user. For example, a user playing a video game may be able to view icons, images or descriptions identifying object models available for use to the user.

At 725, user input is received, the user input selecting one of the presented object models. For example, a user may use a mouse, joystick, video-game controller or touch screen to select a representation of an object model.

At 730, the virtual setting model is augmented with the selected object model. The augmented setting model may appear at least semi-realistic, due to reasonable dimension proportions between the setting model and the object model. The object may, e.g., be rendered as an overlay on objects existing in the virtual setting.

At 735, the user may be allowed to interact with the augmented setting model (e.g., by interacting with the object within the augmented setting model). The user may be able to move, rotate, lift, throw or remove the object from the setting model, and/or the user may be able to cause other objects in the model (e.g., virtual intra-setting objects) to contact the added object. For example, the user may be able to move, drop or throw the added object in a virtual reality. The effect of these virtual actions may be at least somewhat realistic, given the dimensions and physics-related properties of the object model and the setting model. Thus, for example, a system may be able to estimate how far a video-game character can throw an object given an estimated weight of the object and strength of the character; or the system may be able to estimate an amount of destruction caused based on a collision between two objects. For example, a user may augment a virtual setting with a model of his television set. A video game character may then throw a virtual-setting angry bird, ball, etc. at the television set, and the television set may incur realistic but virtual damage or destruction based on estimated physics-related properties associated with the television set.

by an object falling on another intra-setting object given an estimated mass of the falling object and strength of the intra-setting object.

Figure 8:
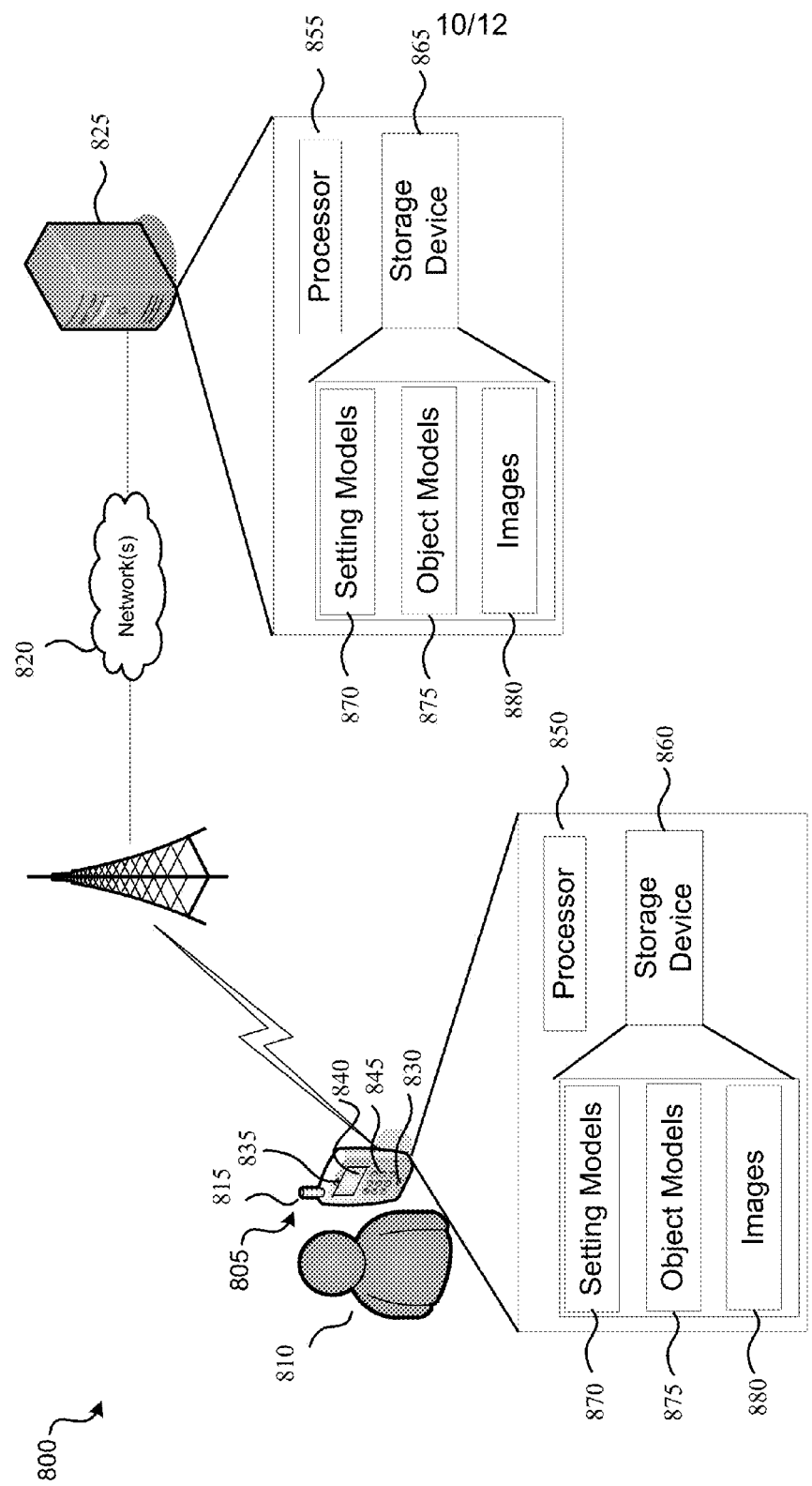
FIG. 8 shows a system for creating, modifying and/or displaying three-dimensional models according to one embodiment.

FIG. 8 shows a system 800 for generating, modifying and/or displaying three-dimensional models according to one embodiment. The system may include a device, which may be an electronic device and/or mobile device (e.g., a cellular phone, smart phone, personal digital assistant, tablet computer, laptop computer, digital camera, handheld gaming device, etc.). As shown, system 800 includes a cellular phone 805 that may be used by a user 810. Device 805 may include a transceiver 815, which may allow the device to send and/or receive data and/or voice communications. Device 805 may be connected (e.g., via transceiver 815) to a network 820 (e.g., a wireless network and/or the Internet). Through the wireless network, device 805 may be able to communicate with an external server 825.

Device 805 may include a microphone 830. Microphone 830 may permit mobile device 805 to collect or capture audio data from the device's surrounding physical environment. Device 805 may include a speaker 835 to emit audio data (e.g., received from a user on another device during a call, or generated by the device to instruct or inform the user 810). Device 805 may include a display 840. Display 840 may include a display, such as one shown in FIGS. 5A-5C. Display 840 may present the user with representations of original or modified models, dynamic images of a surrounding environment (e.g., prior to a user's capture of an image using the device), etc. Display 840 may present interaction options to user 810 (e.g., to allow user 810 to create a new model, modify a model, save a modified model, rotate a view of a model, etc.). Device 805 may include user-input components 845. User-input components 845 may include, e.g., buttons, a keyboard, a number pad, a touch screen, a mouse, etc. User-input components 845 may allow, e.g., user 810 to modify a setting model and/or interact with three-dimensional models being created or modified, such as by allowing interactions shown in FIGS. 4A-4C. Though not shown, device 805 may also include an imaging component (e.g., a camera). The imaging component may include, e.g., a lens, light source, etc.

Device 805 may include a processor 850, and/or device 805 may be coupled to an external server 825 with a processor 855. Processor(s) 850 and/or 855 may perform part or all of any above-described processes. In some instances, model generation and model modification are performed locally on the device. In some instances, external server's processor 855 is not involved in creating, modifying or displaying models. In some instances, models are created using external server's processor 855 and modified using remote processor 850.

Device 805 may include a storage device 860, and/or device 805 may be coupled to an external server 825 with a storage device 865. Storage device(s) 860 and/or 865 may store models, such as setting models and/or object models. Setting models (which may include original and/or modified setting models) may be stored in a setting model database 870 that is independent from an object model database 875 that stores object models. Alternatively, all models are stored in a single database. In one instance, all models may be decomposed into object models. A setting model database may store parameters connecting objects to settings (e.g., identifying objects in a setting, setting dimensions, inter-object distances, etc.). Storage device(s) 860 and/or 865 may include an image database 880 to store images, such as all images used to generate models, all images taken by device 805, all images saved by user 810, etc.

Figure 9:
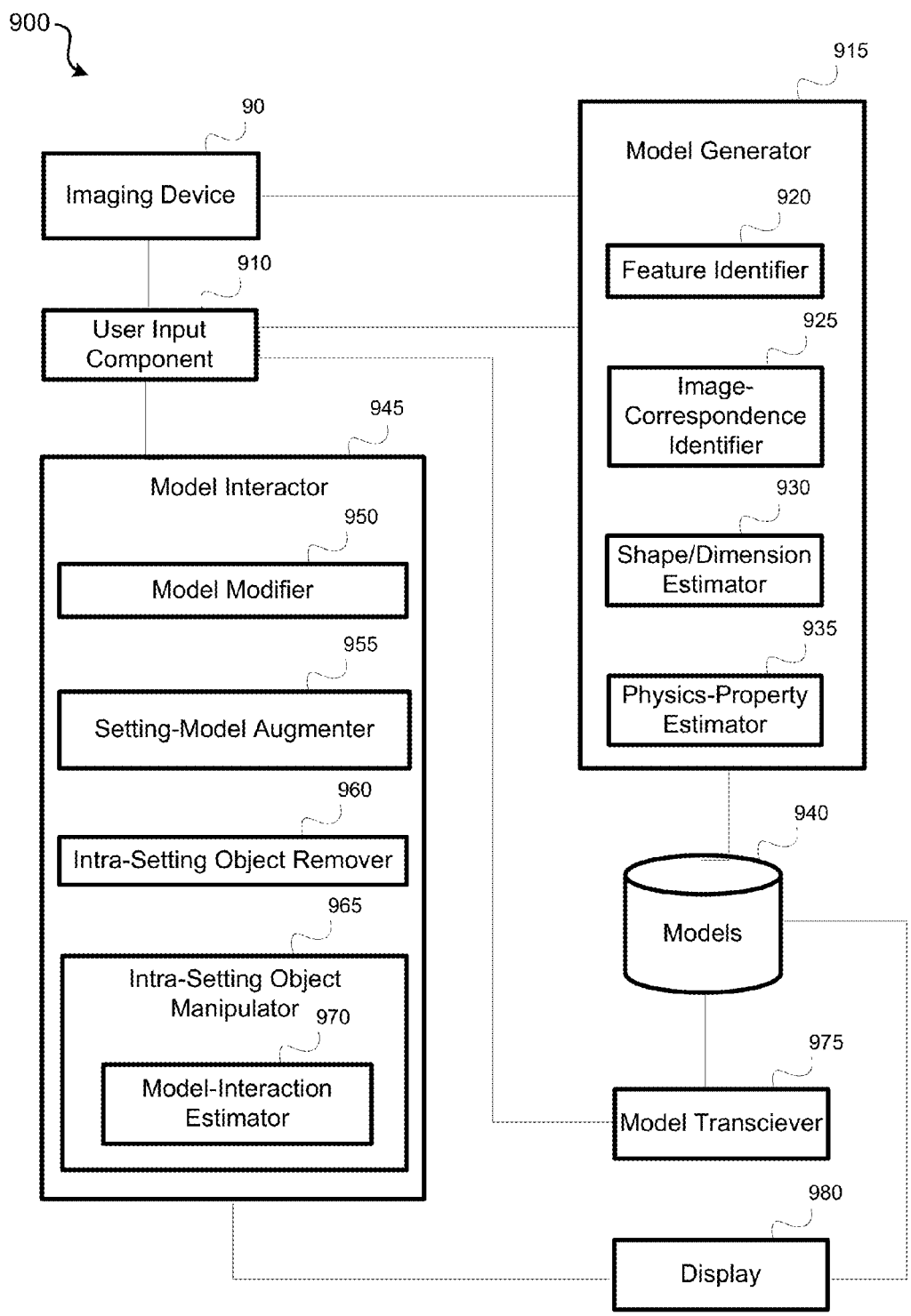
FIG. 9 shows a system for creating, modifying and/or displaying three-dimensional models according to one embodiment.

FIG. 9 shows a system 900 for generating, modifying and/or displaying three-dimensional models according to one embodiment. Part or all of system 900 may be, e.g., incorporated into one or more mobile devices and/or electronic devices (e.g., mobile phones). Part or all of system 900 may be incorporated into a remote server and/or cloud server.

System 900 includes an imaging device 905, which may be configured to capture images and/or videos. Imaging device 905 may include a camera, such as a cell-phone camera. Imaging device 905 may be configured to capture images and/or videos upon receiving a command from a user via a user input component 910. For example, a user may click an image-collection button.

Images captured by imaging device 905 may be processed by model generator 915. Model generator 915 may process the images automatically or upon receiving a command from a user via the user input component 910. Model generator 915 may be configured to generate a setting and/or object model based on one or more images. Model-generation techniques described herein may be implemented by model generator 915.

Model generator 915 may include a feature identifier 920 to identify and locate features within the images. For example, feature identifier 920 may include an edge detector, a corner detector, a high-contrast detector, etc.

Model generator 915 may include an image-correspondence identifier 925 configured to match the features across images. For each matched feature, image-correspondence identifier 925 may associate image-based locations of the features in each of the images with each other. In some instances, image-correspondence identifier 925 identifies a transformation between the images and/or between the images and real life based on the matched features.

Model generator 915 may include a shape/dimension estimator 930. Shape/dimension estimator 930 may estimate a shape and/or one or more dimensions characterizing an object, an object within a setting or a setting. The estimated shape and/or dimension may be based on imaging-device parameters, image-based dimensions of features, image-based distances between features, etc.

Model generator 915 may include a physics-property estimator 935, which may estimate physics-related properties of an object, an object within a setting, or a scene. For example, physics-property estimator 935 may estimate a mass, density, rigidity, strength, etc. of an object. The estimation may be based on visual properties apparent through the images (e.g., a texture on a surface of an object) or based on user input received via user input component 910. In some instances physics-property estimator 935 accesses a database that includes object and material properties. Physics-property estimator 935 estimates an identity of object being imaged (e.g., "Three-drawer desk #459"), looks up the material of the object, and estimates the mass of the object based on the material's density. Databases may include this type of information for commonly available items (e.g., furniture items) and/or for items stored in select stores (such that, e.g., a store could offer augmented-model capabilities for items sold in their store).

Models generated by model generator 915 may be stored in a model database 940. The model database 940 may include, in some instances, models of objects and settings. In some instances, separate databases store models and settings. In some instances, one database stores models of objects, and another stores indications as to how the objects are combined to form a setting. In some instances, only object models or only setting models are stored.

A user may then interact with the models stored in model database 940 via model interactor 945. Thus, a user may enter inputs through a user input component 910 and thereby interact with one or more models.

Model interactor 945 may include a model modifier 950. Model modifier 950 may allow a user to modify, e.g., a color, dimension, shape, etc. of a created model. For example, a user could modify a couch-object model from a white color to a brown color. Thus, through model modifier 950, a user may be able to modify model properties related to physical properties of an object or setting.

Model interactor 945 may include a setting-model augmenter 955. Setting-model augmenter 955 may be configured to augment a setting model with an object model. A user may select the setting model to be augmented and the object model which will augment the setting model. The augmented setting model may include realistic proportions between the setting and object due to estimated dimensions associated with both models.

Model interactor 945 may include an intra-setting object remover 960. A setting model may include a plurality of objects in the model. A user may select one object (e.g., via user input component 910) and request that it be removed. Intra-setting object remover 960 may then remove the object from the setting.

Model interactor 945 may include an intra-setting object manipulator 965. Through intra-setting object manipulator 965 (and, e.g., user input component 910), a user may be able to move, drop, slide, rotate, etc. an object within the setting. The object may be one originally present in the setting or one added to the setting. A model-interaction estimator 970 may estimate an effect of such manipulations. For example, if a user attempts to position one object on top of another, model-interaction estimator 970 may estimate whether the underlying object would be crushed, or if a user attempts to throw one object at another, model-interaction estimator 970 may estimate whether the contacted object will be damaged, destroyed, tilted over, unaffected, etc. In some instances, an effect of a manipulation depends on a character strength. For example, a manipulation may include a video-game character attempting to manipulate the object. The effect of the manipulation may depend, in part, on the strength of the character.

Models (e.g., as generated or after a user interacted with the model to modify the model, augment a model, remove an object from a model, or manipulate an object within a setting) may be received and/or transmitted by model transceiver 975. For example, models may be shared across a model-sharing or social-networking website.

System 900 may further include a display 980. Display 980 may display images captured by imaging device 90, representations of models 940 generated by model generator 915, representations of post-interaction or modified models as modified by model interactor 945, etc. Display 980 may further present instructions to a user.

Figure 10:
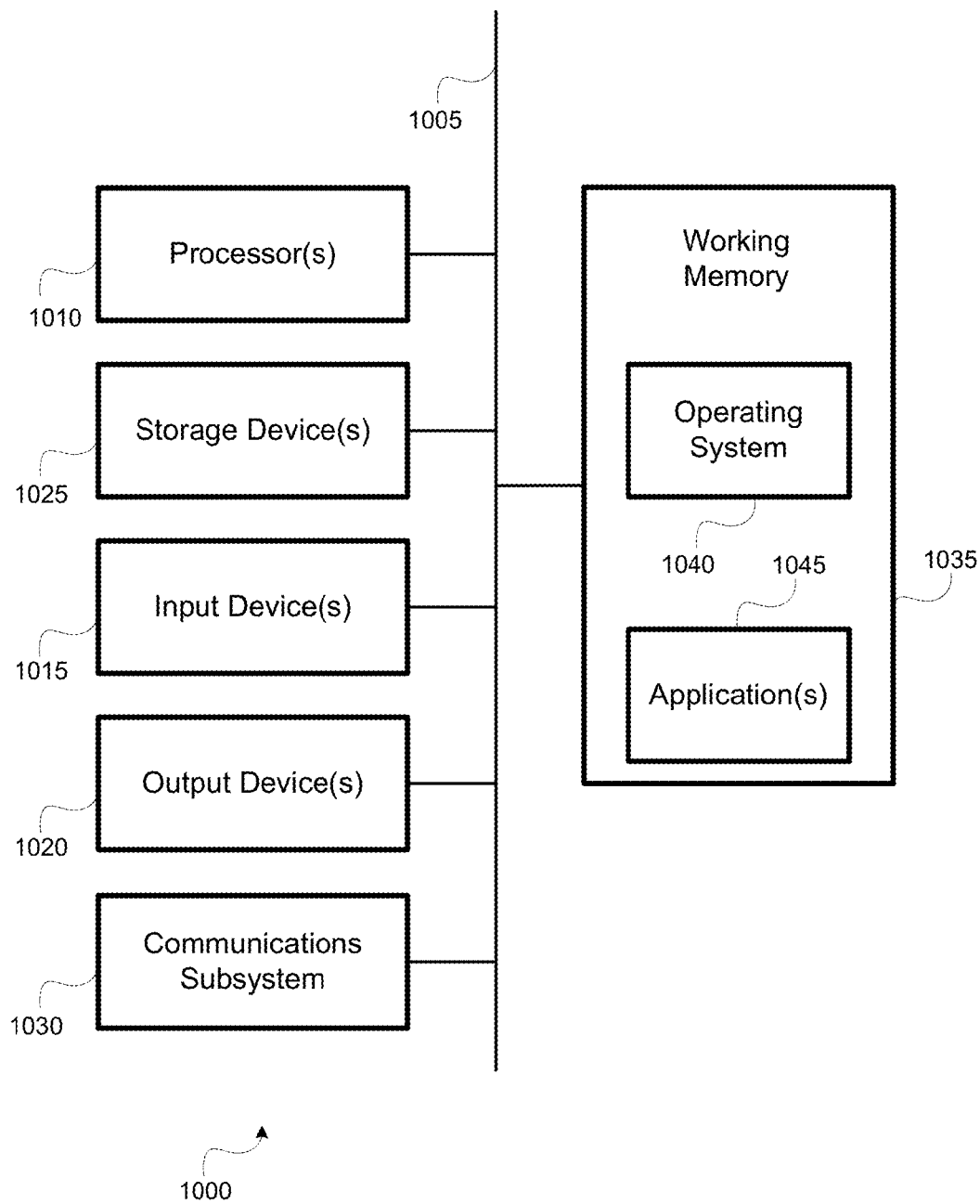
FIG. 10 illustrates an embodiment of a computer system.

FIG. 10 provides a schematic illustration of one embodiment of a computer system 1000 that can perform the methods provided by various embodiments, as described herein and/or may include one or more system components as described herein. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like.

The computer system 1000 may further include (and/or be in communication with) one or more storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as the system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments. For example, a computer system may perform part or all of method 100, method 200, method 400 or method 700. Further, one or more components of system 800 or 900 may (individually or collectively) include a computer system (e.g., computer system 1000). According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using the computer system 1000, various computer-readable media might be involved in providing instructions/code to processor(s) 1010 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application. Also, a number of steps may be undertaken before, during, or after the above elements are considered. Accordingly, the above description does not bound the scope of the claims.

What is claimed is:

1. A method for presenting a representation of an augmented real-world setting on a mobile device, the method comprising:

accessing a plurality of images, wherein the plurality of images comprises a first set of images depicting one or more objects and a second set of images depicting a real-world setting;

detecting at least one real-world object within the first set of images, wherein the detecting is based on estimating a shape of the real-world object based on one or more image correspondences identified among the plurality of images;

detecting a real-world setting within the second set of images;

automatically creating an object model of the detected real-world object based on the first set of images, the object model having dimensions based at least in part on one or more estimated intrinsic parameters associated with an imaging-device used to capture the plurality of images;

creating a setting model of the setting based on the second set of images;

receiving information indicative of user input identifying a request that the setting be augmented;

creating a modified setting model comprising the object model and the setting model; and presenting the modified setting model on the mobile device.

2. The method of claim 1, further comprising:
automatically extracting frames from a video of the real-world object, wherein the extracted frames comprise the first set of images of the real-world object.

3. The method of claim 1, wherein the object model comprises an estimated mass or density of the object.

4. The method of claim 3, further comprising: receiving the estimated mass or density of the object from a user of the mobile device.

5. The method of claim 1, wherein a degree of detail included in the object model depends on how many images of the real-world object were accessed.

6. The method of claim 1, wherein a degree of detail included in the object model is determined at least partly based on information indicative of input by a user of the mobile device, the input by the user of the mobile device indicating a balance between the degree of detail and a processing time associated with creation of the object model of the object.

7. The method of claim 1, further comprising:
capturing the first set of images of the real-world object; and
capturing the second set of images of the real-world setting.

8. The method of claim 1, wherein the method is performed in its entirety on the mobile device.

9. The method of claim 8, wherein the modified setting model is created upon receiving model-modification input from a user via the mobile device.

10. The method of claim 8, wherein the object model is created upon receiving first model-creation information indicative of first model-creation user input, and the setting model is created upon receiving second model-creation information indicative of second model-creation user input.

11. A method for sharing models of real-world objects, the method comprising:
accessing a plurality of images, wherein the plurality of images comprises a first set of images depicting one or more objects and a second set of images depicting a real-world setting;
detecting at least one real-world object within the first set of images, wherein the detecting is based on estimating a shape of the real-world object based on one or more image correspondences identified among the plurality of images;
automatically creating a three-dimensional model of the detected real-world object based on the first set of images, the three-dimensional model having dimensions based at least in part on one or more estimated intrinsic parameters associated with an imaging-device used to capture the plurality of images;
creating a setting model of the setting based on the second set of images;
receiving information indicative of user input identifying a request that the three-dimensional model of the object be shared with another user;
creating a modified setting model comprising the three-dimensional model and the setting model;
transmitting the three-dimensional model over a network to another mobile device; and
presenting the modified setting model on the another mobile device.

12. The method of claim 11, wherein the three-dimensional model is transmitted over the network via a social networking website.

13. The method of claim 11, wherein the method for sharing models of real-world objects is performed in its entirety on a cellular phone.

14. A system for presenting a representation of an augmented real-world setting on a mobile device, the system comprising:
an imaging device configured to capture a first set of images of a real-world setting and a second set of images of a real-world object;
a feature identifier configured to detect at least one real-world object within the first set of images and a real-world setting within the second set of images, wherein the detecting is based on estimating a shape of the real-world object based on one or more image correspondences identified among the first set of images;
a model generator configured to automatically generate an object model of the detected real-world object based on the first set of images to generate a setting model of the real-world setting based on the second set of images, the object model having dimensions based at least in part on one or more estimated intrinsic parameters associated with the imaging device;
a user input component configured to receive information indicative of user input identifying a request that the setting be augmented;
a model interactor configured to create a modified setting mode comprising the object model and the setting model; and
a display configured to present the modified setting model.

15. The system of claim 14, wherein the model interactor comprises a setting-model augmentor configured to augment the setting model with the object.

16. The system of claim 14, wherein the setting model comprises models of a plurality of objects, one of the plurality of objects being the real-world object.

17. The system of claim 14, wherein the object model includes real-world dimensions of the object, and wherein the setting model includes real-world dimensions of the setting.

18. A system for presenting a representation of an augmented real-world setting on a mobile device, the system comprising:
means for accessing plurality of images, wherein the plurality of images comprises a first set of images depicting one or more objects and a second set of images depicting a real-world setting;
means for detecting at least one real-world object within the first set of images, wherein the detecting is based on estimating a shape of the real-world object based on one or more image correspondences identified among the plurality of images;
means for detecting a real-world setting within the second set of images;
means for automatically creating an object model of the detected real-world object based on the first set of images, the object model having dimensions based at least in part on one or more estimated intrinsic parameters associated with an imaging-device used to capture the plurality of images;
means for creating a setting model of the setting based on the second set of images;
means for receiving information indicative of user input identifying a request that the setting be augmented;
means for creating a modified setting model comprising the object model and the setting model; and
means for presenting the modified setting model.

19. The system of claim 18, wherein the modified setting model accurately reflects a ratio of dimensions of the real-world object compared to dimensions of the real-world setting.

20. The system of claim 18, wherein the setting model and the object model each include metadata indicating globally common-scale dimensions associated with the respective model.

21. The system of claim 18, further comprising:
means for matching a region from an image of the first set of images depicting the object to a region from an image of the second set of images depicting the object, wherein the matched regions are predicted to correspond to a same real-world feature.

22. A non-transitory computer-readable medium containing a program for execution by a processor which executes steps of:
accessing a plurality of images, wherein the plurality of images comprises a first set of images depicting one or more objects and a second set of images depicting a real-world setting;
detecting at least one real-world object within the first set of images, wherein the detecting is based on estimating a shape of the real-world object based on one or more image correspondences identified among the plurality of images;
detecting a real-world setting within the second set of images;
automatically creating an object model of the detected real-world object based on the first-set of images, the object model having dimensions based at least in part on one or more estimated intrinsic parameters associated with an imaging-device used to capture the plurality of images;
creating a setting model of the setting based on the second set of images;
receiving information indicative of user input identifying a request that the setting be augmented;
creating a modified setting model comprising the object model and the setting model; and
presenting the modified setting model.

23. The non-transitory computer-readable medium of claim 22, wherein the modified setting model is created by modifying the setting model to replace an initial object present in the real-world setting with the object.

24. The non-transitory computer-readable medium of claim 22, wherein the real-world object is an object in the real-world setting, and wherein creating the modified setting model comprises moving the object within the setting.

25. The non-transitory computer-readable medium of claim 22, wherein the real-world object is an object in the real-world setting, and wherein creating the modified setting model comprises modifying the setting model to remove the object from the setting.

26. A method for presenting a representation of an augmented real-world setting on a mobile device, the method comprising:
accessing an object model of a detected real-world object based on a first set of images depicting the object, the object model having been automatically created based on the first set of images of the object, the object model having dimensions based at least in part on one or more estimated intrinsic parameters associated with an imaging-device used to capture the first set of images, and wherein detection of the real-world object is based on estimating a shape of the real-world object based on one or more image correspondences identified among the first set of images;
accessing a setting model of a real-world setting based on a second set of images depicting the setting, the setting model having been created based on the second set of images of the setting;
receiving information indicative of user input identifying a request that the setting be augmented;
creating a modified setting model based on the setting model and the object model; and
presenting the modified setting model on the mobile device.

27. The method of claim 26, wherein the first set of images depicting the object were captured by a user of another mobile device.

28. The method of claim 26, wherein the object model is accessed via a website.

29. The method of claim 26, wherein the object model comprises a model shared by a user of another device with the user of the mobile device.

* * * * *